June 17, 1941. M. H. ARMS 2,245,894
SIZE CONTROLLING MECHANISM
Filed Feb. 10, 1939 9 Sheets-Sheet 1

June 17, 1941.  M. H. ARMS  2,245,894

SIZE CONTROLLING MECHANISM

Filed Feb. 10, 1939  9 Sheets-Sheet 3

Inventor
Merton H. Arms
by Wright Brown Quinby & May
Attys

June 17, 1941.  M. H. ARMS  2,245,894

SIZE CONTROLLING MECHANISM

Filed Feb. 10, 1939  9 Sheets-Sheet 4

Inventor
Merton H. Arms

Patented June 17, 1941

2,245,894

UNITED STATES PATENT OFFICE 2,245,894

SIZE CONTROLLING MECHANISM

Merton H. Arms, Springfield, Vt., assignor to Bryant Chucking Grinder Company, Springfield, Vt., a corporation of Vermont Application February 10, 1939, Serial No. 255,604

28 Claims. (Cl. 51—165)

This invention relates to sizing mechanism with particular relation to the control of the dimensions of work pieces as turned out by automatic machines, and has for an object to provide for automatic adjustment of the size controlling means for each piece in accordance with a measured dimension of a previous piece.

A further object is to provide means for automatically gaging each finished piece, the result of the gaging determining the feed setting of the tool for operation on a subsequent piece.

While the invention broadly is applicable to a great variety of machines and machining operations, certain embodiments shown herein by way of illustration and not of limitation, employ grinding as the operation controlled, and more specifically, internal grinding.

Such embodiments are illustrated in the accompanying drawings in which.

Referring first to the construction shown in Figures 1 to 9, the invention is shown as applied to an internal grinding machine of the general type shown in the Bryant Patent No. 1,765,787 granted June 24, 1930, to which patent reference may be had for the details of operation of the machine. For present purposes it is only sufficient to point out that the work pieces are held individually in a rotary work holder 1 and that the grinding wheel (not shown) is carried by a rotary shaft 2 slidably journaled in an arm 3 which is mounted for rocking motion coaxial with a grinding wheel drive shaft 4. The drive shaft 4 carries a pulley 5 about which a belt 6 passes and which also engages around a small pulley on the outer end of the grinding wheel shaft 2. The feed motion of the grinding wheel with reference to the work is produced by swinging the arm 3 about its pivotal axis, this being accomplished by the axial motion of a feed screw 7 (Figure 5), which is shown best in Figure 4 of the Bryant patent and numbered 85. This feed shaft has threaded thereon a nut or sleeve 8 which is journaled in a bushing 9 in the frame of the machine. This screw is held against rotation, as shown in that patent, so that the rotation of the sleeve 8 produces axial motion of the screw and a consequent feed and retracting motion to the grinding wheel, depending on the direction of rotation of the sleeve 8. At its outer end this sleeve 8 has keyed thereto a sleeve 10 which has journaled thereon a feed wheel 11 retained in position between a flange 12 on the inner end of the sleeve 10 and a nut 13 threaded on its outer end. This wheel 11 is provided with one or more handles 14 by which it may be turned and it has fixed therein a stub shaft 15 which has journaled thereon a gear collar 16. This collar 16 has two integral gears 17 and 18 thereon, the teeth of the gear 17 meshing with teeth cut in the flange 12 of the sleeve 10, while the teeth of the gear 18 engage teeth in a gear portion 19 of a sleeve 20 journaled on the bushing 9. The sleeve 20 is provided with a worm gear portion 21 with which meshes a worm 22 keyed to a sleeve 23 (see Figures 4 and 5), which in turn is rotatable on a shaft 24 and in bearings 23a. It will be evident, therefore, that by rotation of the sleeve 23, the sleeve 19 will be turned and through its geared connection through the sleeve 16 it will rotate the sleeve 10 and the nut 8, even though the feed wheel 11 is not turning.

Figures 4, 5, 6:
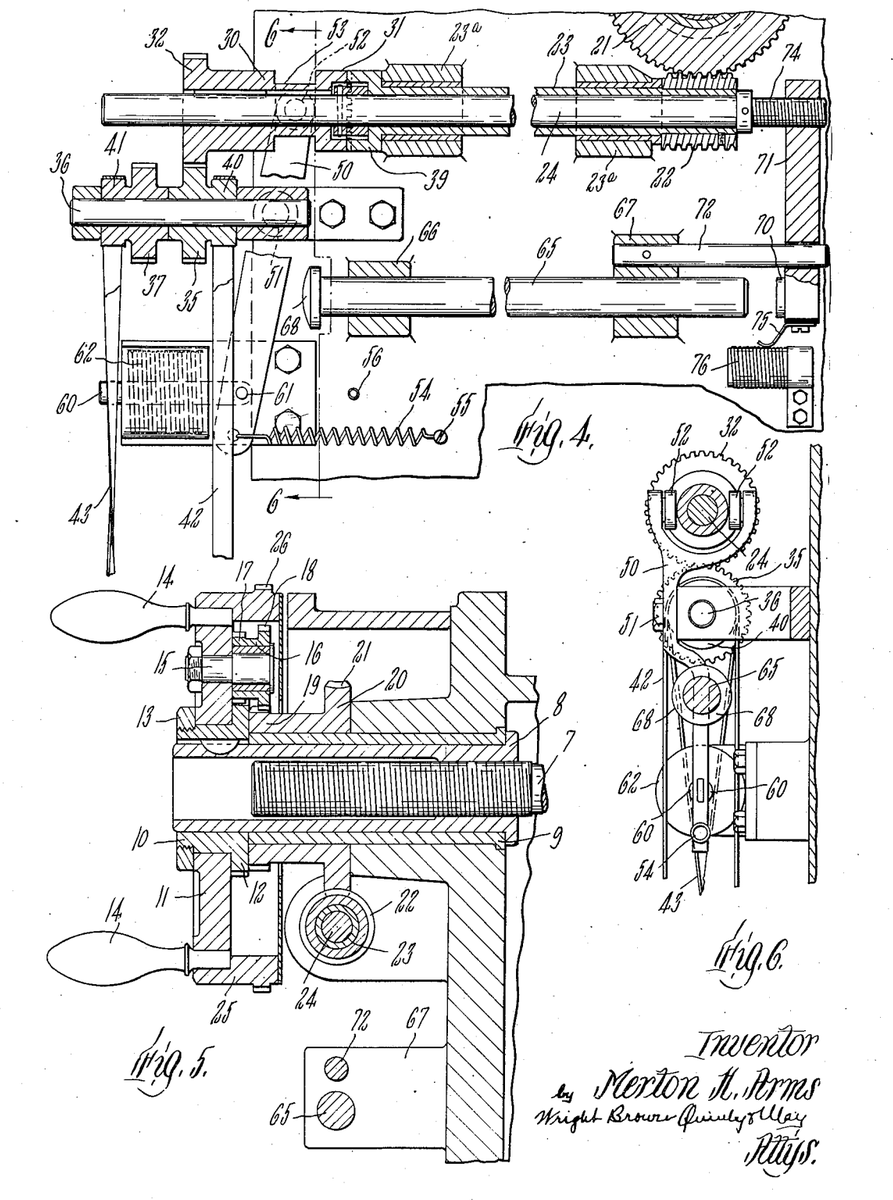
Figure 4 is a fragmentary view partly in section of a portion of the tool-feeding mechanism shown in elevation and to a smaller scale on Figure 1.
Figure 5 is a detail section to a larger scale on line 5—5 of Figure 1.
Figure 6 is a detail section on line 6—6 of Figure 4.

As shown in Figure 5 this wheel 11 is provided with a peripheral inwardly directed flange 25 provided with ratchet teeth 26 thereon, these corresponding to the teeth 93 of the feed wheel 90 in the Bryant patent. While the feed wheel 11 is rotatable on the sleeve 10, its rotation even with the sleeve 19 stationary, rotates the sleeve 10 and with it the nut 8, and as the feed wheel 11 may be effected in the same manner as the rotation of the wheel 90 in the patented construction, no further discussion thereof will be made herein. A feed motion is also produced by the rotation of the sleeve 19.

Figures 7, 8:
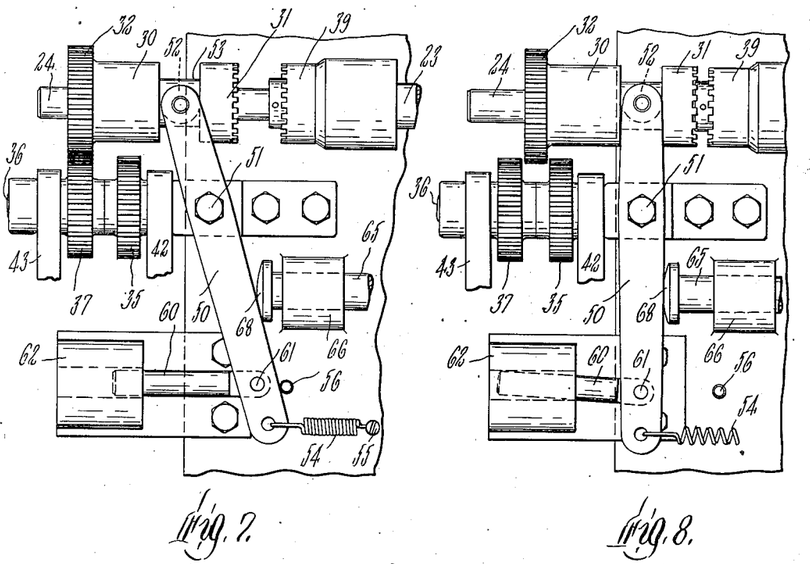
Figures 7 and 8 are fragmentary elevations of portions of the mechanism shown in Figure 4, but in different positions.

As shown best in Figure 4, the shaft 24 has splined thereon an axially movable sleeve 30, one end of which is formed as one member of a clutch at 31, while the other end portion is formed with an integral gear 32, which by axial motion of the sleeve 30 may be moved into any one of three positions shown in Figures 4, 7 and 8, respectively. In Figure 4 the gear 32 is in mesh with a gear 35 journaled on a stub shaft 36. In Figure 7 the gear 32 is shown in mesh with a gear 37, also journaled on the stub shaft 36, while in Figure 8 the gear 32 is positioned between the gears 35 and 37 and in mesh with neither, this being a neutral position of the sleeve 30. It will likewise be noted that in the position of Figure 4, where the gear 32 is in mesh with the gear 35, the clutch at 31 is closed, there being a mating clutch element 39 carried at the left hand end of the sleeve 23 to which the worm 22 is fixed. In both of the other axial positions of the sleeve 30 shown in Figures 7 and 8, the clutch at 31 is in unclutched condition so that the worm 22 is rotarily disconnected from the sleeve 31 and hence receives no motion from rotation of this sleeve 30. The two gears 35 and 37 are driven in opposite directions. Each is provided with an integral belt pulley such as 40 and 41 and these pulleys have engaged therewith the belts 42 and 43, the belt 43 being shown as crossed and both passing about an elongated driving pulley 44 (see Figure 1), fixed to the main power shaft of the machine and which carries the main drive pulley 45. The sleeve 30 is shifted from one to another of its three positions by means of a shift lever 50 fulcrumed at 51 to a portion of the machine frame and carrying at its upper end cam rollers 52 (Figures 4 and 6) riding in a cam groove 53 in the sleeve 30. The lower end of the lever 50 has secured thereto one end of a spring 54, the other end of which is secured to a fixed part of the machine frame as at 55, this spring biasing the lever 50 to the position shown in Figure 7 with the lever contacting a fixed stop 56, the gear 32 being then in mesh with the gear 37 and the clutch at 31 open.

Two means are effective to swing the lever 50 in opposition to the tension of the spring 54. One of these means comprises a magnetic plunger 60 pivoted to the lever 50 at 61 and extending into a solenoid 62. The other means comprises a bumper bar 65 mounted for axial movement in the guide lugs 66 and 67 and which is provided with a rounded head 68 which may impinge on the lever 50 below its fulcrum 51. This bumper bar 65 may be struck at its opposite end by an abutment 70 on a slide 71 (Figure 4). this slide is guided on a pin 72 fixed to the guide lug 67 and has threaded engagement with a threaded end portion 74 of the shaft 24. Thus as the shaft 24 is driven in one or the other direction by rotation of the sleeve 30, depending with which of the gears 35 and 37 the gear 32 is then in mesh, the member 71 is traversed and when moved to the left, as shown in Figure 4, it may contact with and move the bumper bar 65 to the left. In the position shown in Figure 4, however, the abutment 70 has been retracted out of contact with the bumper bar 65. It should be noted, however, that the worm 22 which drives the feed shaft 21 is rotated in one direction only since it is only when the sleeve 30 is in its right hand position with the gear 32 in mesh with the gear 35 that the clutch at 31 is closed. This is the feed direction of rotation of the worm gear 21 and therefore compensates for wear in truing of the wheel in effecting a feed provided, the work gaged, which controls the extent of this feed, is insufficiently ground away. The slide 71 carries insulated therefrom a contact slider 75 which rides across a resistance coil 76, thus to cut in or out resistance of this coil depending on the direction of motion thereacross. The variable resistance 76 (Figure 9) constitutes a corrective follow-up portion of an electrical system including the gage by the response of which the feed control, through the mechanism just described, is produced.

Figures 1, 2, 3:
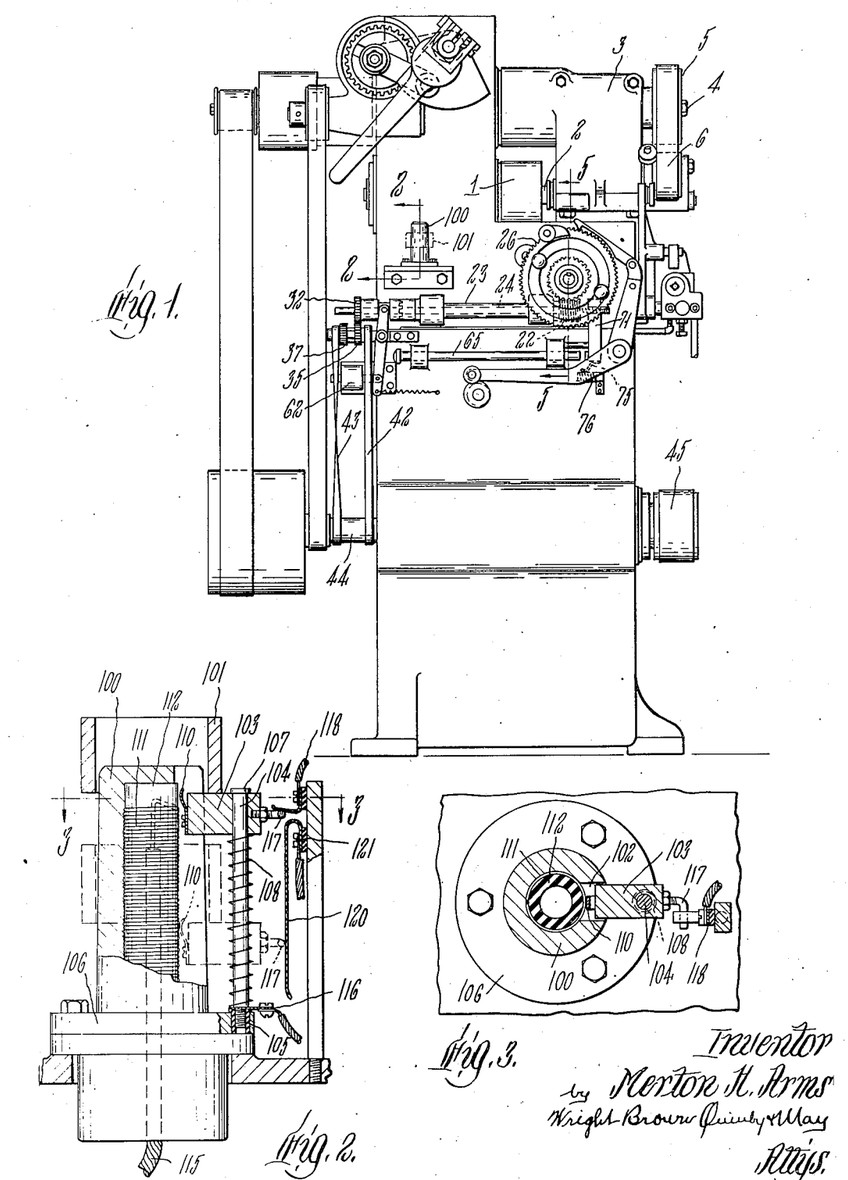
Figure 1 is a front elevation of a single spindle grinding machine embodying this invention.
Figure 2 is a detail section to a much larger scale on line 2—2 of Figure 1 and showing the gaging mechanism.
Figure 3 is a detail section on line 3—3 of Figure 2.

The gage itself is shown in detail in Figures 2 and 3. Referring to these figures, it will be seen that the gage is a plug gage having the tapered plug 100 over which the work piece 101 to be gaged may be placed, the extent to which the work piece may descend toward the larger end of the plug being a measure of the size of the hole therein. Through one side of this plug 100 there is formed a slot 102 within which a slider 103 may ride. This slider is mounted on a headed post 104 secured as by threading its lower end at 105 into a base flange 106 of the gage. This slide 103 is normally lifted into contact with the head 107 of the post 104 as by means of a light coil spring 108 which surrounds the post 104. This spring is too light to counterbalance the weight of a work piece 101, so that as soon as the work piece is placed over the gaging plug 100, the slider 103 descends, as to the dotted line position shown in Figure 2, as far as the size of the hole in the work piece permits. This slide 103 is provided with an electrical contact finger 110 which, when the slide 103 is in fully raised position, is above a resistance coil 111 carried by an insulating core 112 arranged coaxially within the plug 100, but as the slide 103 is depressed by the weight of a work piece thereon, the finger 110 wipes across the resistance coil 111 to an extent determined by the axial position of the work piece as determined by the size of the hole therethrough. Thus the resistance included between the finger 110 in its lowered position and the upper end of the resistance is a measure of the size of the work piece, since this amount is determined by the extent to which the work piece may descend over the tapered plug. A conductor 115, shown in Figure 2 as passing out through the lower end of the plug gage, connects to the top of the resistance coil 111. The contact finger 110 is in electrical connection through the slide 103, the post 104 and the spring 108 with a terminal 116. When the slide 103 is in its upper limit of motion, it is also in electrical connection through a contact 117 with a terminal 118, but when the slide 103 is depressed, as by the placing of a work piece over the gage plug, the contact between the member 117 and the terminal 118 is broken, and a contact is made between the element 117 and the long spring contact 120 leading to the terminal 121.

Figure 9:
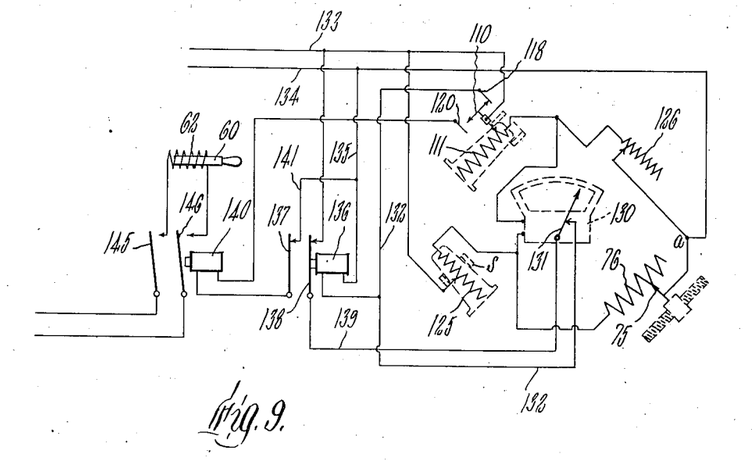
Figure 9 is an electrical diagram of the feed control mechanism.
Figure 10:
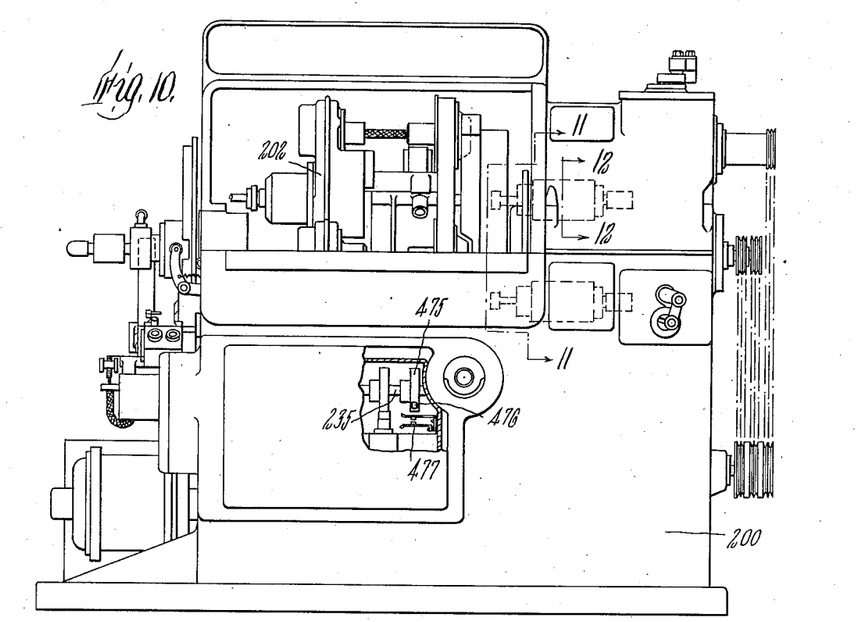
Figure 10 is a front elevation of a multiple spindle grinding machine embodying the invention and with automatic gaging.
Figure 11:
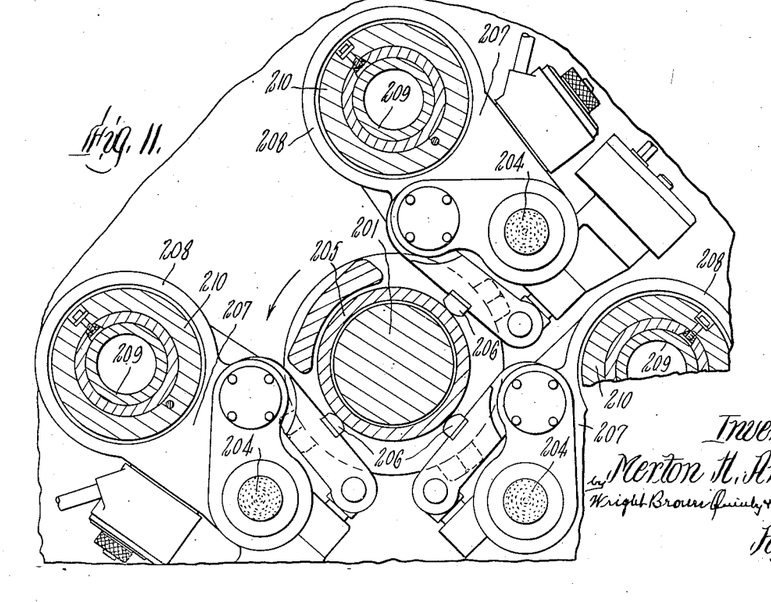
Figures 11 and 12 are detail sections on the correspondingly numbered section lines of Figure 10.

The wiring diagram for the gaging mechanism is illustrated in Figure 9. The resistance coil 111 of the test gage is arranged in bridge formation with the resistance 125 of a standard gage plug with a work piece S of desired standard size thereon, a variable resistance 126, and the resistance 76 across which the slider 75 traverses as previously described. At 130 is a microammeter which is adapted to register the balance or lack of balance between the various resistances in the bridge circuit, and when out of balance in one direction to make contact at 131 with a lead 132. This lead 132 is connected up with the slide 110 in the test gage and when there is no work piece thereon makes contact with the terminal 118 as previously described. This terminal leads to one side of a source of low potential through the lead 133. The other side 134 of this low potential supply leads to one corner of the bridge at $a$ and through the line 135 to the coil 136 of a relay, which, when energized, closes the two switches 137 and 138. The opposite side of the relay coil 136 is connected to the line 132. When the test gage has no work piece thereon, the contact between the slide 103 and the terminal 118 is made, completing a connection from the low potential line 133 through the line 132, the relay coil 136, back to the line 134. This energizes the relay and closes the switches 137 and 138. The closure of the switch 138 also completes a low voltage circuit from the line 133 through the switch 138, the line 139, the ammeter contact 131 and line 132, the coil 136 and the line 135 to the line 134, so that the switch 138 is held closed even though the contact at 118 is broken. When the finished piece to be gaged is placed on the plug gage, thus breaking the contact at 118 and making a contact with the element 120, the switch 137 being then closed, a connection is made from the line 133 through the contact 120 through the relay coil 140 back through the switch 137 and the line 141, the line 135, and back to the opposite side of the low voltage source. This closes the switches 145 and 146 from the high voltage source through the solenoid 62. This acts to pull the core 60 to the left, thus rocking the lever 50 and closing the clutch at 31 and bringing the gears 32 and 35 into mesh as shown in Figure 4. This causes the sleeve 23 as well as the shaft 24 to be rotated in one direction, the rotation of the sleeve 23 acting to turn the feed wheel in feeding direction. The rotation of the shaft 24 moves the slide 70 and the slider 75, thus changing the effective value of the resistance 76, in a direction to balance the bridge circuit and proportional to the departure of such measured dimension from the exact dimension desired, and as soon as this is accomplished, the contact at 131 is broken which therefore deenergizes the relay coil 136 which cannot at that time receive energy through the contact 118. This causes the switches 137 and 138 to open, the opening of the switch 137 immediately deenergizing the relay coil 140, causing the deenergization of the solenoid 62. This permits the spring 54 to throw the lower end of the lever 50 to its extreme right hand position, this throwing the sleeve 30 to the left and bringing the gear 32 into driving relation to the gear 37. This gear 32 is thus rotated in the reverse direction, but as the clutch 31 is now open, the feed wheel 21 is not moved in either direction, but the shaft 24 is now driven in a reverse direction. Its threaded connection with the slide 71, then causes this slide to return toward the left until the abutment 70 strikes the bumper bar 65 and moves this bumper bar to the left until it reaches the position in Figure 8, where the gear 32 has been moved to its neutral position. This condition persists as long as the work piece being gaged remains on the test gage plug 100, the presence of this work piece preventing the closing of the contact at 118 with the slide 103 which is necessary in order to effect energization of the relay coil 136 and the closing of the switches 137 and 138. It will thus be seen that each time a finished work piece is placed over the test gage and the bridge circuit is out of balance, an additional feed motion of the wheel toward the work accompanied by a corrective follow-up changing the electrical condition in a direction to bring the parts back to balanced condition is produced, this feed stopping, however, the moment that bridge balance is reached at which time a corrective feed for the next grinding operation has been made, its extent depending on the amount of departure from correct size of the previously ground piece as determined by the test gage. The reverse rotation of the shaft 24 brings the corrective follow-up back to starting position out of control by the gage, in condition for a subsequent gaging operation on the last sized piece of work.

In Figures 10 to 21, inclusive, there is illustrated an internal grinding machine of the multi-spindle type in which the work is automatically fed to the work spindles and when completed is removed therefrom, the work being automatically gaged while it remains on the work holder after the grinding operation and in response to which gaging the feed of the final wheel is adjusted preparatory to operating on the next work piece presented thereto.

The particular machine shown in this application and illustrated in these figures is not claimed herein per se and forms subject matter of an application for patent of Johnson et al Serial No. 152,582, filed July 8, 1937, for Multiple spindle machine. This machine comprises a base 200 in which is longitudinally journaled, as best shown in Figures 11, 12, 13, 18 and 21, an axially movable shaft 201. This shaft carries a work-holding spider 202 which is reciprocated axially to bring work holders 203 thereon into and out of axial operative position with respect to a plurality of grinding wheels 204. At suitable times, also, this spider is indexed to bring the work holder successively into the various operative stations of the machine. At one end of the spider 202 the shaft 201 carries a guide sleeve 205 which forms an abutment on which may ride shoes 206, each shoe being carried by means, which will later be more fully described, by a grinding unit 207. There are one less grinding units than there are work holders, so that one of the indexing stations shown at A in Figure 18 has no grinding wheel and is a loading and unloading station at which the finished pieces of work are removed from the work holders and the pieces of work to be ground are inserted in position therein for the subsequent grinding operations. Each of the grinding wheel units comprises a casing 208 having a tubular portion 209 journaled in a sleeve 210 in which it is rockably and axially movable. The axial motion is one of traverse to cause the grinding wheel to traverse the work and may be produced by any suitable mechanism, the details of which are not material to this invention. The feed of each of the grinding wheels with relation to the work piece at its respective station is accomplished by movement of its shoe 206 in a manner to determine the angular position of the casing 207 with relation to its supporting sleeve 210 but for the purpose of this invention only that grinding wheel which is positioned to produce the finishing cut is of importance, since it is this wheel only which is controlled by the work gage.

Figures 12, 13:
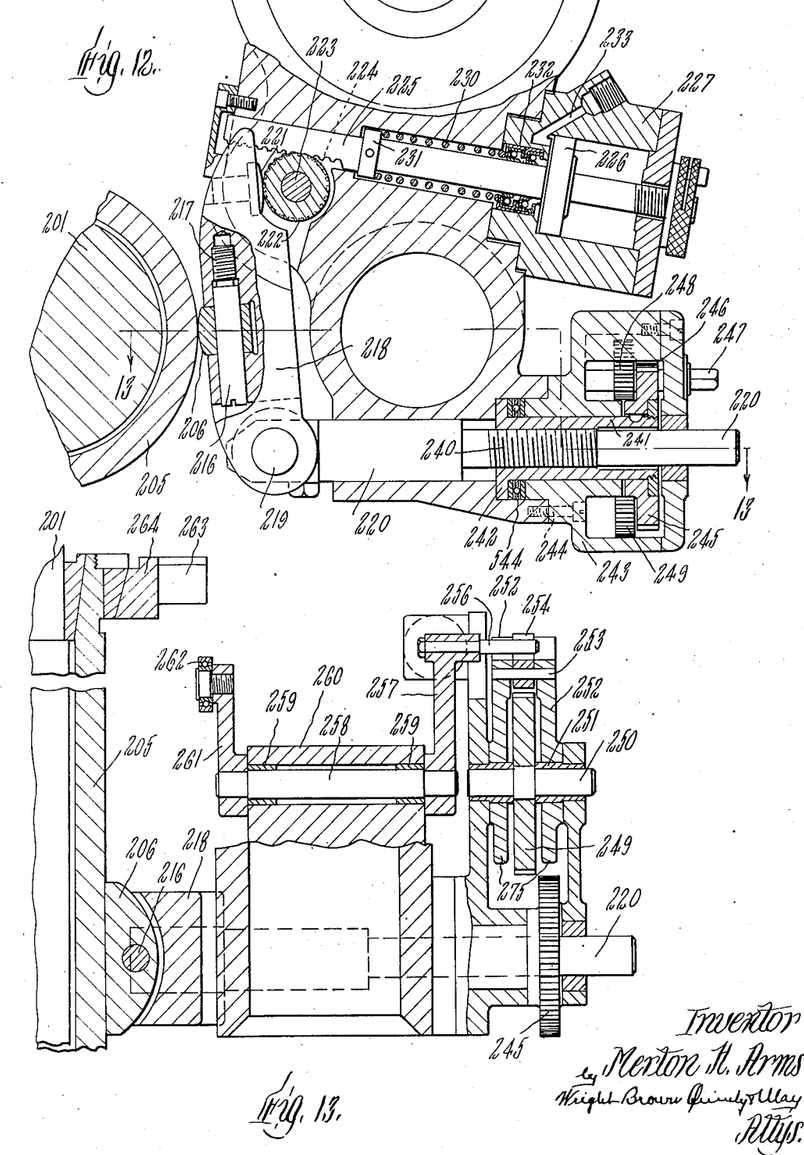
Figure 13 is a detail section on line 13—13 of Figure 12.
Figure 14:
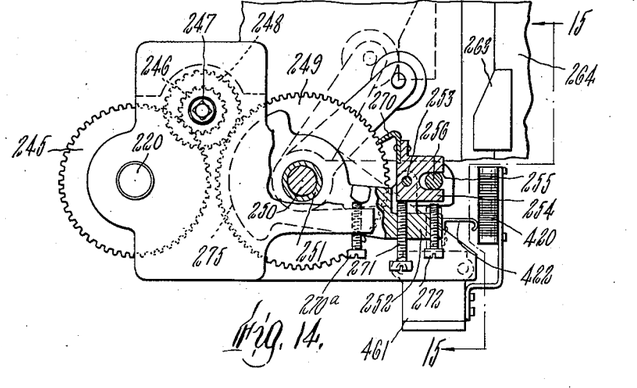
Figure 14 is a detail view partly in elevation and partly in section of the mechanism shown in Figures 12 and 13 looking toward the left.
Figure 15:
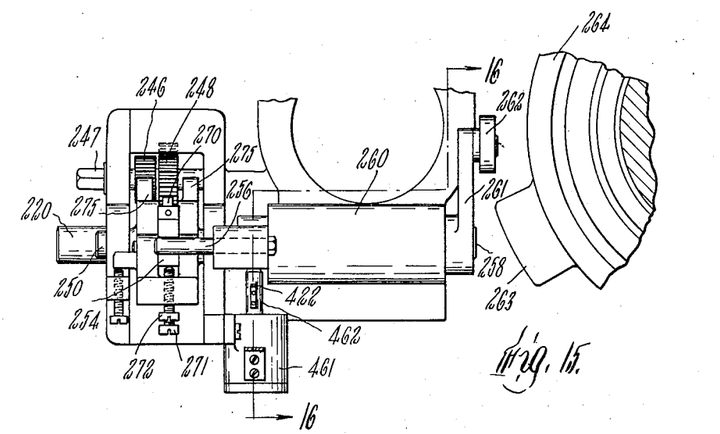
Figure 15 is a detail section on line 15—15 of Figure 14.
Figure 16:
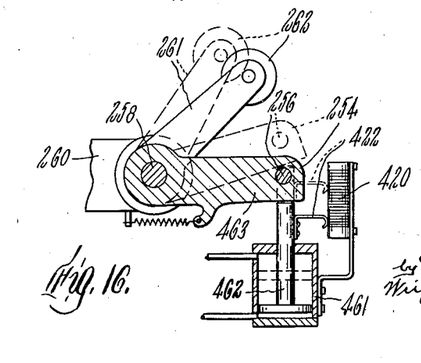
Figure 16 is a detail section on line 16—16 of Figure 15.

Referring to Figure 12, each shoe 206 is carried by a short shaft 216 which has threaded connection at 217 with a portion of a lever 218. The lever 218 is fulcrumed at 219 on a bar 220 which is axially adjustable, this axial adjustment being produced, as will later appear, in response to the automatic gaging of the work piece at the loading and unloading station, the grinding of which has just been completed by the grinding wheel of the finishing unit. The opposite end of the lever 218 is provided with a hardened wear piece 221 which engages an eccentric 222 on a shaft 223. This shaft 223 is provided with a pinion 224 which meshes with teeth on a rack bar 225. This rack bar forms a piston rod to which is attached a piston 226 mounted for reciprocation in a fluid pressure cylinder 227. The piston 226 is normally held at its inner limit of motion, as shown, by a coil spring 230 surrounding the rod 225 and reacting between a collar 231 pinned thereto and a sealing member 232 which acts as a packing for the rod 225 adjacent to the piston 226. By introducing fluid pressure back of the piston 226 as through a port 233, the piston may be driven to the right as viewed in Figure 12, moving the rack bar and rotating the eccentric 222 which rocks the lever 218. This acts to move the wheel head away from the axis of the shaft 201 and produces a feed of the grinding wheel into the work. This is the normal feed action of the grinding wheel and may be the same construction for all the grinding wheel units, the extent of eccentricity of the eccentric 222 determining the amount of the feed for each work piece and being uniform at each actuation of the feed by this portion of the mechanism, the feed and retraction taking place automatically for each work piece operated upon in one complete machine cycle. A cam shaft 235 (see Figure 10) which is driven in time with the machine is provided with suitable cams thereon for controlling hydraulic valves which cause the introduction and discharge of fluid pressure from the various feed cylinders 227 and various other hydraulic mechanisms, some not material to this invention, which act to determine the cycle of operations of the machine.

Besides the normal feed of each grinding wheel for operation on each of the pieces of work which is submitted in turn to the action of this wheel, there is also provision for compensating for wheel truing and wear, which as before noted, is effected by axial motion of the bar 220. For present purposes the construction for effecting such compensation for the last or finishing grinding wheel only is described, as it is to this compensation that a further additional feed may be added to an extent depending upon the response of the gaging mechanism when the last previous work piece has been sized and found to require a correction to be made in the succeeding finishing grinding operation. The rear end of the bar 220 is threaded at 240 (see Figure 12) and in engagement with this portion is an internally threaded sleeve 241 by the rotation of which the bar 220 may be moved axially. This sleeve 241 is provided at one end with a flange 242 between which and a stationary cap member 243 is positioned the ball bearing 544. The cap member 243 is secured to the grinding wheel unit casing as by screws 244. Thus the sleeve 241 is held against axial motion relative to the truing mechanism casing while it is permitted angular motion. It has keyed thereto a gear 245 with which meshes a pinion 246 (see Figures 14 and 15) carried by a stub shaft 247. Rotatable with the pinion 246 is a gear 248 which meshes in turn with a gear 249 fixed to a shaft 250. Rockably mounted on a bushing 251 in which the shaft 250 is journaled are two arms 252 which project beyond the gear 249 and have pivoted between them on the pin 253, a feed block 254. This feed block is provided with a slot 255 at its outer end within which rides a pin 256 projecting laterally from the outer end of a rock arm 257. This rock arm is secured to one end of a rock shaft 258 journaled in spaced bearings 259 in a portion 260 of the truing device casing. The opposite end of the rock shaft 258 has secured thereto a rock arm 261 carrying a cam roller 262 at its outer end. This cam roller 262 lies in the path of a cam block or lug 263 (see Figures 13, 14 and 15) extending from a ring 264 which is secured to the rear end of the spider 265 rockable on the sleeve 205 on which ride the shoes 206 of the grinding wheel units. This spider 265 which passes lengthwise of the sleeve 205 between the wheel units is movable axially with the shaft 201 and when the shaft 201 is moved axially into its indexing position the block 263 is brought into alinement with the cam roller 262. The spider 265 has an enlarged end portion 266 (Figures 21 and 23) which carries the truing devices 267 for the grinding wheels and during the last fifteen degrees of indexing motion, it is connected for turning movement with the work-carrying spider. The indexing motion is produced by rocking of the indexing arm 268 (Figures 21 and 22) in the direction of the arrow, as produced by the fluid pressure motor 2680 acting through the rack 2681 and the pinion 2682. This arm has a follower 2683 which engages successively in the slots 2684 of the Geneva wheel 2685 keyed to the shaft 201 and moved into cooperative relation to the follower when the shaft 201 is moved axially to bring the work holders out of operative relation to the grinding wheels. Actuation of the motor 2680 to oscillate the arm 268 may be produced by a suitable controlling valve (not shown) actuated by a cam on the cam shaft 235. Axial motion of the shaft 201 to indexing position moves the truing device carrying part 266, which also carries a spring-pressed latch member 2686, from the position shown in Figure 24 to the position shown in Figure 25, when the latch member is in position to be struck by an abutment 2687 carried by the work-holding spider 202, after this spider has been indexed all but fifteen degrees of its complete motion, which, with four spindles would be ninety degrees. The turning of the spider 265 during the indexing motion causes the cam 263 to wipe across the cam roller 262, effecting a rocking motion thereof and lifting the arm 254. This causes a feed dog 270 to engage between the teeth of the gear 249 and to step this gear around to an extent determined by the setting of an abutment screw 270a. The setting of a pair of adjusting screws 271 and 272 determine the limits of rocking motion of the block 254. The arms 252 are shown as provided with counterbalance weights 275.

The mechanism thus described furnishes the normal feed increment to compensate for wheel wear and truing, the extent of which is determined by the setting of the screws 271 and 272. An additional feed increment, the amount of which is dependent on the gage response, is superposed thereon, and determines the initial setting from which the normal tool feed takes place.

Figures 17, 18, 19, 20:
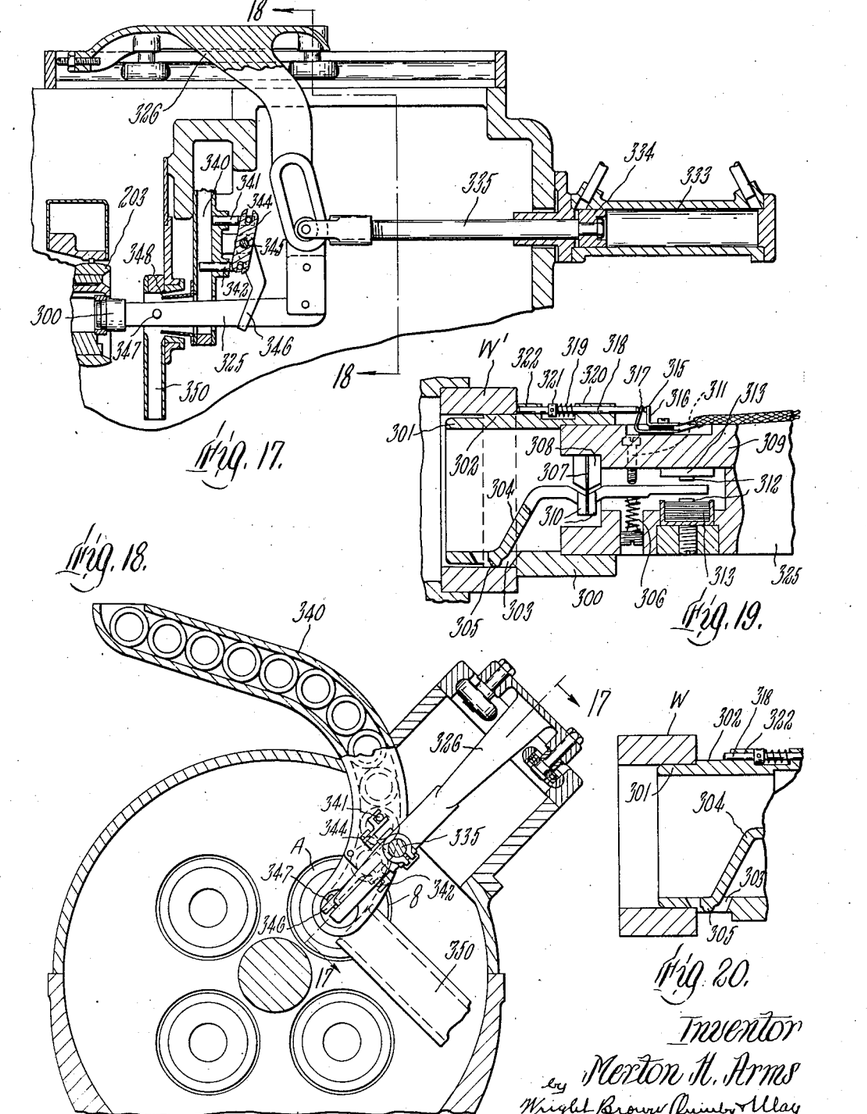
Figure 17 is a detail section on line 17—17 of Figure 18 and through the automatic gaging and work feeding mechanism.
Figure 18 is a detail section on line 18—18 of Figure 17.
Figure 19 is a detail section to a larger scale of the gaging head shown in elevation in Figure 17 and with the finished work in gaging position.
Figure 20 is a view similar to a portion of Figure 19, but showing the work piece preparatory to being ground and as it is being presented to the work spindle.
Figures 21, 22, 23, 24, 25:
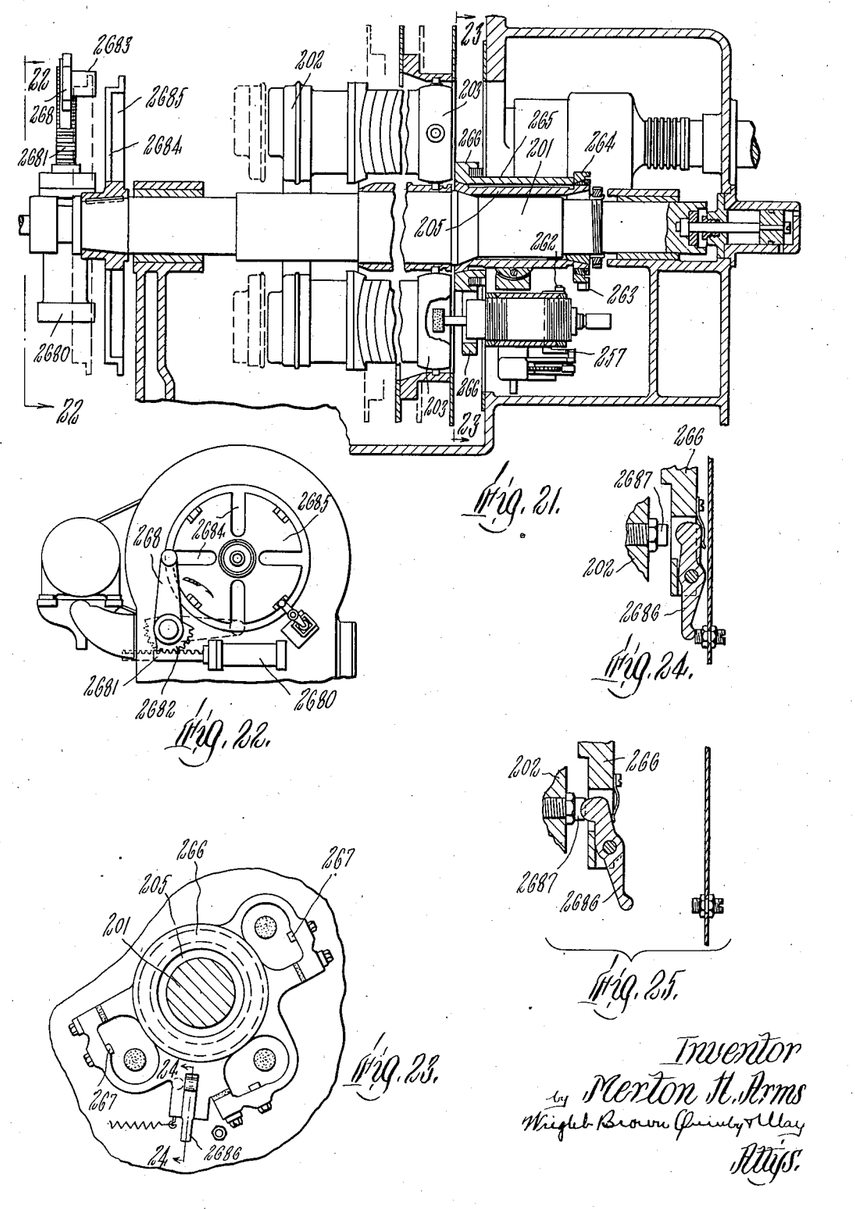
Figure 21 is a central longitudinal sectional view of the machine shown in Figure 10.
Figures 22 and 23 are detail sections on the correspondingly numbered section lines of Figure 21.
Figure 24 is a detail section on line 24—24 of Figure 23.
Figure 25 is a view similar to Figure 4 but showing the part in indexing position.

As shown in Figures 17 to 20, the gaging is effected by a combined gage and work loading and unloading member indicated generally at 300. This gage comprises a sleeve (see Figure 19) having an end portion of reduced external diameter as at 301, this diameter being such that it may enter an unground work piece W, as shown in Figure 20. Back of this reduced diameter portion is a larger diameter portion 302 which may enter within a ground work piece W', as shown in Figure 19. The outer end portion of the sleeve 300 is provided at one side with a slot 303 in which rides one end portion of a gaging lever 304 provided at its outer end with a hardened gaging abutment 305 which is adapted to directly engage the inner face of work piece W' being gaged where it is held as by a spring 306. The fulcrum of the lever 304, as shown, is formed by a leaf spring 307 which is held rigidly at one end between the jaws 308 carried by the shank portion 309 of the gaging element and at the other clamped between portions 310 of the arm 304. A stop screw 311 defines the limit to which the lever 304 may be moved by the action of the spring 306.

The rear end of the lever 304 extends between the cores 312 of inductance coils 313, the swinging of the end of the lever between these cores affecting the reluctances of the coils to the passage of alternating current therethrough and throwing them into or out of balance with each other, depending on the position of this lever. In order that the gaging lever may be out of operation, except when a work piece W' is in gaging position, a normally open switch is shown at 315 having a fixed arm 316 and a spring arm 317 which may be pushed into contact with the fixed arm by means of a plunger 318 normally spring pressed into switch-open position as by the spring 319 reacting between a bearing shoulder 320 through which the plunger 318 is slidable, and a collar 321 secured to the plunger. The forward end of the plunger extends through a bearing 322 and when no work piece is in position extends forwardly thereof as shown in Figure 20, but when a work piece W' to be gaged is in gaging position, this plunger 318 is pressed rearwardly thereby and the switch 315 is closed as shown in Figure 19. This gaging and work presenting and withdrawing element is shown as secured to an arm 325 carried by a carriage 326 guided for rectilinear motion in the machine frame and caused to be traversed by fluid pressure which is admitted or discharged by suitable valve mechanism (not shown), but which may be controlled by a cam on the cam shaft 235, from opposite ends of a cylinder 333 on either side of the piston 334, the rod 335 of which is operatively connected to the carriage 326 and the arm 325.

Work pieces to be ground are delivered to a chute 340 (see Figures 17 and 18) and descend to the lower portion thereof where there is positioned a pair of pins 341 and 342 which alternately project and are retracted from the path of motion of the work pieces, as by the rocking motion of an arm 344 carried by a rock shaft 345 and having slots at its ends into which are engaged cross pins from the pins 341 and 342. The lever arm 344 is rocked by a lever 346 which may be struck by a pin 347 projecting laterally from the arm 325 on retraction of the gage member from the work holder, thus to project pin 341 into stopping relation to the next to the end work piece in the chute 340 and to retract the pin 342 to free the lowest work piece to pass into position where the gaging element may engage in it as shown in Figure 20, and by which it may be thrust forward into the work holder. When the gaging element moves forwardly to present an unground work piece to the work holder, the pin 347 is moved away from the arm 346 which returns by gravity to the position of Figure 17, retracting the pin 341 and projecting the pin 342. This allows the column of work pieces to descend, the lower piece being stopped by the pin 342.

On retraction of the gaging piece after a gaging operation and while it is withdrawing a work piece W' therewith, this work piece is engaged by the forward ends of spring fingers 348 which prevent its retraction with the gaging head, releasing it therefrom so that it is discharged from the machine as through the chute 350. Thus at each forward motion of the gage toward the work holder it first picks off a piece of work from the supply chute and presents it to the work holder which is closed upon it. It then withdraws a portion of its distance, and the machine indexes, bringing a completed piece of work into alinement therewith. The gaging head is then pushed forward further than previously so as to bring the work piece W' into gaging position as shown in Figure 19, and then as it fully withdraws, the gaged and finished work piece is removed from the gaging head and escapes through the chute 350, the gaging head being then in position to receive a fresh work piece on its next forward motion to present it to the work holder from which the finished piece has been withdrawn.

Figure 26:
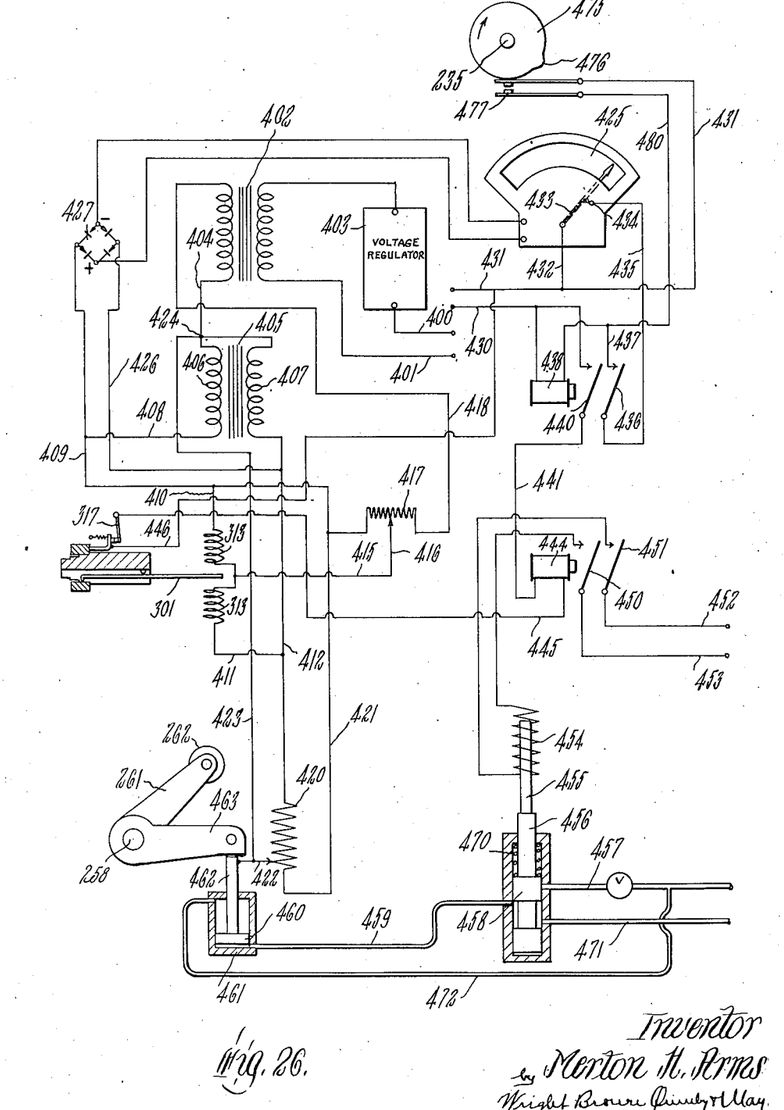
Figure 26 is an electrical diagram of the gaging and sizing control mechanism.

Figure 26 illustrates diagrammatically the gaging circuits by which a gaging response to the size of the work is produced and a compensating feed of the finishing grinding wheel is produced in a direction to cure any deficiency in the feed of the wheel for the succeeding grinding operation determined by gaging the previously ground piece of work. Referring to this diagram, electric power may be supplied from a suitable alternating current source through the lines 400 and 401 to the primary of a transformer 402, and if necessary, through a suitable voltage regulator shown diagrammatically at 403. From the secondary of the transformer 402 power is taken through the line 404 to the differential transformer 405 having the windings 406 and 407. These windings 406 and 407 are arranged in a bridge circuit with the two coils 313 of the gaging mechanism. Thus one end of the coil 406 is connected through the lines 408, 409 and 410 to one of the coils 313, the opposite end of this coil being connected to the other coil 313 and through the lines 411 and 412 to the transformer coil 407. Midway between the coils 313 there is a connection through the line 415 to the mid-point of a slider 416 of a potentiometer 417, one side of which is connected to the line 409 and the other side of which is connected through the line 418 back to the secondary of the transformer 402. This potentiometer provides for a magnification adjustment of the gaging response. Also connected into the lines 411 and 412 is a variable resistance 420 the opposite end of which is connected through the line 421 to the line 409. A slider 422 on this resistance is connected through the line 423 to the common point 424 of the transformer coils 406 and 407. Variations of the setting of this slider 422 effect the balance or amount of lack of balance of the bridge circuit and constitute the corrective follow-up. The extent of any unbalance is shown by the position of the pointer of the microammeter 425 which is supplied with rectified current from across the bridge circuit through the lines 409 and 426 and a full wave rectifier at 427. This line 426 is connected into the line 412.

A low voltage supply of any suitable description is led into the system through the leads 430 and 431. The lead 431 connects through the lead 432 to the pointer 433 of the microammeter, and when this microammeter is out of balance as shown, this needle may make contact at 434 through the lead 435 with one side of a switch 436. When this switch 436 is closed, it makes a connection through the lead 437 through a relay coil 438 with the opposite side of the supply line 430, this coil when energized serving to close and maintain closed the switch 436 and also a switch 440. The switch 440 when closed establishes a connection from the lead 430 and the lead 441 through the relay coil 444, the line 445, to the movable switch contact 317 in the gaging head, and when the work is in gaging position closing the switch contact, connects through the line 446 back to the opposite side of the supply line 431. The energization of the relay coil 444 closes the switch arms 450 and 451 and establishes a connection from the high voltage lines 452 and 453 to a solenoid 454 in which extends a core 455 of a fluid pressure valve 456, so that when this coil 454 is energized the core 455 is drawn thereinto, opening up a fluid pressure passage 457 past the valve head 458, the pipe 459 and beneath the piston 460 in a fluid pressure cylinder 461, causing the raising of this piston. The rod 462 of this piston 460 engages an arm 463 secured to the shaft 258 (see Figures 15, 16 and 26) and turns this shaft 258 to an extent greater than that imparted thereto by the compensating cam 263, while at the same time it moves the slider 422 along the resistance 420, changing the conditions of balance or unbalance of the bridge circuit and thus changing the direct current supplied to the ammeter 425. On balance being reached, taking into account the comparative reactances of the coils 313 (depending on the gaging position of the lever 304, which in turn is controlled by the size of the work being gaged), the contact between the needle 433 and the line 435 is interrupted, opening the circuit through the relay 438, which in turn opens the circuit through the switches 450 and 451 and stops the pull of the solenoid 454. Thereupon a spring 470 returns the valve stem 456 to the position shown in Figure 26 wherein the pipe 459 is open to the discharge pipe 471, and fluid pressure from pipe 457 passing through the pipe 472 above the piston 460 acts to return this piston to its lowered position. This allows the parts, including the corrective follow-up resistance slide 422, to return to their former positions, but as the arm 463 has already been lifted and the additional feed of the wheel produced, the desired results have been accomplished. It will be noted that the fluid pressure supply leads to both sides of the piston 460 but due to the greater area beneath the piston than above it, the piston rises when the valve 466 admits pressure to the pipe 459.

Since it is important that no feed compensation shall be produced when the parts are thus returned to their former position, provision is made by which this is prevented. This is done by the action of a cam 475 secured to the cam shaft 235 by which the various controls of the machine are produced, this cam having a cam projection 476 thereon, which, when compensation is desired, is arranged to close the switch at 477. This switch is in the circuit from the low voltage lines 431 to the line 480. At all other times this switch 477 is open and until it is closed the solenoid 438 cannot be energized to close the switches 440 and 436. It will be evident that where the bridge circuit is subjected to alternating current voltage various forms of variable impedance can be employed for the electrical characteristics compared, as, for example, variable resistances, inductances or capacitances, as may be found convenient.

As a matter of convenience the term "untooled work" has been used herein to denote the work piece to be operated upon and sized by the machine, and the work piece after the machine has operated thereon and brought up to a desired dimension has been termed "tooled work," but it should be understood that these are relative terms only, as machining and tooling operations would commonly be performed on the work piece prior to the sizing operation.

From the foregoing description of certain embodiments of this invention, it will be evident to those skilled in the art that the invention may be embodied in other types of machines and with many modifications without departing from the spirit or scope of this invention as defined by the appended claims.

I claim:

1. A sizing machine having a sizing gage, means responsive to work size when tested by said gage, means producing a standard sizing response, means for supporting work, means for supporting a tool for operation on work on said work supporting means, means for relatively moving said supports to determine the completed size of work subjected to the tooling operation, and means controlled by differences in response of said two responsive means actuating said moving means in a manner to minimize such differences.

2. A sizing machine having a sizing gage, means responsive to variations of work size when tested by said gage, means for supporting work, means for supporting a tool for operating on work on said work supporting means, means for relatively moving said supports to determine the completed size of work subjected to the tooling operation, means controlled by said responsive means at the end of a sizing operation determining the relative positions of said supports in proportionality to such size variations as produced by said moving means for a subsequent sizing operation, and means rendering said responsive means inoperative to effect said controlling means except when a work piece is in position to be tested by said gage.

3. A sizing machine having a sizing gage, means responsive to work size when tested by said gage, means producing a standard sizing response, means for supporting work, means for supporting a tool for operation on work on said work supporting means, means for relatively moving said supports to determine the completed size of work subjected to the tooling operation, means controlled by differences in response of said two responsive means actuating said moving means in a manner to minimize such differences, and means rendering said responsive means inoperative to effect said controlling means except when a work piece is in position to be tested by said gage.

4. A sizing machine having a work support, a tool for operating on work held by said support, means for feeding said tool with respect to the work, a work gage for a work piece and giving a response to work gaged thereby proportional to a dimension of said work piece, means producing a standard response corresponding to the desired dimension, and means responsive to the difference between said gage response and said standard response for adjusting said feeding means.

5. A sizing machine having a work support, a tool for operating on work held by said support, means for feeding said tool with respect to the work, a work gage for a work piece and giving a response to work gaged thereby proportional to a dimension of said work piece, means producing a standard response corresponding to the desired dimension, means responsive to the difference between said gage response and said standard response for adjusting said feeding means, and means for rendering said responsive means inoperative in the absence of a work piece in gaging relation to said gage.

6. A sizing machine having a work support, a tool for operating on work held by said support, means for feeding said tool with respect to said work support during the sizing operation by a definite amount from a starting position for each work piece, means for automatically gaging the work while it is held by said support at the conclusion of a sizing operation, and means controlled by the response of said gaging means for setting said feeding means to the starting position for the next sizing operation by an amount proportional to the departure of the work gaged from the desired gaged dimension.

7. A sizing machine having a work support, a tool for operating on work held by said support, means for feeding said tool with respect to said work support, means for removing the work after a sizing operation from said support and for supplying unsized work to said support, said removing and supplying means including a gaging means for gaging the sized work before it is removed, and means controlled by the response of said gaging means to the sized work for adjusting said feeding means.

8. A sizing machine having a work support, a tool for operating on work held by said support, means for feeding said tool with respect to said work support, work-gaging means, means for automatically actuating said feeding means to feed said tool toward the work during the sizing operation and to then retract said tool from the work, and then to gage the work by said gaging means, and means responsive to said work-gaging means during such gaging for controlling the limit of such feeding means for the next subsequent sizing operation.

9. A sizing machine having a work support, a tool for operating on work held by said support, means for feeding said tool with respect to said work support, work-gaging means, means for automatically actuating said feeding means to feed said tool toward the work during the sizing operation and to then retract said tool from the work and to effect a gaging action of said work-gaging means, and means responsive to said work-gaging means during said gaging action for actuating said feeding means and controlling the limit of feed of said feeding means for the next subsequent sizing operation.

10. In an internal grinding machine having a work support, a grinding wheel for operating in a hole in work carried by said support, and means for feeding said wheel relative to the work during the grinding of each work piece, a gage for measuring the size of hole in a ground work piece, and means controlled by the response of said gage to a gaging operation to determine control of said feeding means for a subsequent grinding operation.

11. In an internal grinding machine having a work support, a grinding wheel for operating in a hole in work carried by said support, and means for feeding said wheel relative to the work during the grinding of each work piece, a gage over which a ground work piece may be engaged, means responsive to the gaging response of said gage to such work piece for adjusting the retracted position of said feeding means for the next subsequent grinding operation, and means for actuating said feeding means a predetermined amount from said adjusted retracted position for said next grinding operation to cause said gaging action to determine the setting of the wheel for determining the final size of the next work piece ground.

12. A sizing machine having a work support, a tool for operating on work held by said support, means for feeding said tool with respect to work held by said support, a gage for measuring sized work having an electrical characteristic variable in accordance with a dimension of the work gaged, a bridge circuit containing said gage and responsive in its condition of balance or lack of balance to the value of said characteristic, means responsive to said condition controlling a setting of said feeding means, and corrective follow-up means actuated by the control of said feeding means to bring said condition to a predetermined state.

13. A sizing machine having a work support, a tool for operating on work held by said support, means for feeding said tool with respect to work held by said support, means for producing a corrective action on said feeding means, means for gaging a sized work piece, means responsive to a departure in the response of said gaging means during a gaging action from a response corresponding to the desired dimension for actuating said corrective means, a corrective follow-up for said responsive means interposing a response equal to said departure when said correcting means has been adjusted to proper correction, and means then acting out of control of said gage for setting said follow-up to initial condition for a subsequent gaging operation.

14. A multiple spindle machine having a plurality of work holders and a plurality of tool holders with which work pieces on said work holders cooperate successively, one of said tool holders having a tool for providing the final sizing machining operation for work carried by all of said work holders, means producing a tool feed of predetermined amplitude for said final sizing tool from an adjustable starting position, means for gaging a work piece after said final sizing operation has been performed thereon, and means responsive to departures from the desired size of the work piece so gaged to adjust said starting position for a subsequent sizing operation to reduce the amount of such departure in the sizing of the work piece to be sized in said subsequent operation.

15. In a machine of the class described having a work support, a tool support and means for feeding said tool support relative to said work support, a gage with which tooled work may be measured, mechanism associated with said feeding means comprising a pair of rotary elements, means for continuously driving said rotary elements in opposite directions, an element shiftable into driven relation to either of said rotary elements and having an intermediate neutral position out of driven relation with both of said elements, means in clutching relation with said shiftable element when said shiftable element is in driven relation to one only of said rotary elements for driving said feed means, means actuated by a departure in response of said gage to a response indicating correct work size for shifting said shiftable element into driven relation to said one rotary element to thereby effect actuation of said feeding means in size-correcting direction, a corrective follow-up actuated by rotation of said shiftable element in either direction for overcoming the effect of said response departure after a predetermined extent of corrective actuation of said feeding means, means acting on the overcoming of said effect to shift said shiftable element into driven relation to said other rotary element, and thereby effect return of said corrective follow-up to its initial position, means actuated by such return to shift said shiftable element to its neutral position, and means for holding said gage inoperative except when a work piece is in gaging relation thereto.

16. A combined work supporting member and gage having a pair of work-engaging parts of different size, the size of one part being that for supporting untooled work and the size of the other part for supporting tooled work, means cooperating with said other part only for gaging a tooled dimension of work positioned thereon, and means for moving said supporting member while supporting work to transfer the work supported thereby from one to another position.

17. A combined work supporting member and gage for internal work comprising a plug having an end portion of smaller external diameter arranged to be inserted in untooled work and a portion of larger diameter for insertion in tooled work and of too large diameter to receive untooled work, means cooperating with said larger diameter portion only for gaging the internal diameter of work positioned thereon, and means for moving said supporting member while supporting work to place untooled work engaged thereby into tooling position, and to remove tooled work from said position.

18. A combined work supporting member and gage having a pair of work-engaging parts of different size, the size of one part being that for supporting untooled work and the size of the other part for supporting tooled work, means cooperating with said other part only for gaging a tooled dimension of work supported thereon, and means rendering said gaging means inoperative to produce a gaging response except when a work piece is in gaging relation to said other part.

19. A combined work supporting member and gage for internal work comprising a plug having an end portion of smaller external diameter arranged to be inserted in untooled work and a portion of larger diameter for insertion in tooled work and of too large diameter to receive untooled work, means cooperating with said larger diameter portion only for gaging the internal diameter of work thereon, and means rendering said gaging means inoperative to produce a gaging response except when a work piece is in gaging relation to said larger diameter portion.

20. The combination with a plug having a portion of smaller diameter for insertion into untooled work, and a portion of larger diameter for insertion into tooled work and of too large diameter for insertion into untooled work, a work feeler positioned to engage the inner face of work on said larger diameter portion, gaging means responsive to the position of said feeler, and means for moving said supporting member while supporting work to transfer work from one to another position.

21. The combination with a plug having a portion of smaller diameter for insertion into untooled work, and a portion of larger diameter for insertion into tooled work and of too large diameter for insertion into untooled work, a work feeler positioned to engage work on said larger diameter portion, gaging means responsive to the position of said feeler, and means for rendering said responsive means inoperative except when a work piece is positioned on said larger diameter portion.

22. A work loading and unloading member having a pair of work engaging parts of different sizes, the size of one of said parts being that for cooperation with untooled work and the size of the other part that for cooperation with tooled work, means for moving said member to deliver untooled work engaging said one part to tooling mechanism and to remove tooled work engaging said other part from said mechanism, and means associated with said other part for gaging a dimension of tooled work received from said mechanism.

23. In combination, a work loading and unloading member comprising a plug having a portion of smaller diameter for entering an untooled hole in the work, and a larger diameter portion for entering the tooled hole in similar work and of too large diameter to enter the untooled hole, means for moving said member to engage in the untooled work and present said work to tooling mechanism and to engage in the hole of tooled work at said mechanism and unload the tooled work therefrom, and gage mechanism comprising a feeler carried by said member for engagement within the tooled hole of work on said larger diameter plug portion.

24. In combination, a work loading and unloading member comprising a plug having a portion of smaller diameter for entering an untooled hole in the work, and a larger diameter portion for entering the tooled hole in similar work and of too large diameter to enter the untooled hole, means for moving said member to engage in the untooled work and present said work to tooling mechanism and to engage in the hole of tooled work at said mechanism and unload the tooled work therefrom, a gage mechanism comprising a feeler carried by said member for engagement within the tooled hole of work on said larger diameter plug portion and means responsive to the position of said feeler, and means for rendering said responsive means inoperative in the absence of work from such larger diameter plug portion.

25. A sizing machine having an internal sizing gage, means responsive to work size when tested by said gage, means for effecting successive inside tooling operations on work pieces, means automatically testing each piece of work by said gage after the tooling operation for that piece and before the commencement of the next tooling operation, and means controlled by said responsive means, when such test is made, effective on said effecting means for the next subsequent tooling operation and proportional to the extent of departure of the interior of the work tested from the desired size to reduce the departure from the desired size of the next tooled work piece.

26. A sizing machine having a work support, a tool for operating on work held by said support, means for relatively moving said tool and work on said support during a sizing operation to produce sizing tooling operations on the work, a work gage, means for presenting said gage to the work on said work support after the tooling operation has been performed thereon, and means controlled by the response of said gage to a completed work piece to adjust said relative moving means for the next succeeding sizing operation in accordance with and proportional to departure from a desired dimension of a completed work piece.

27. In a machine of the class described, a work support, a tool for operating in a hole in work carried by said support, and means for feeding said tool relative to the work, a plug having a smaller dimensioned portion for insertion into the hole of untooled work, and a portion of larger dimension for insertion into the hole of tooled work, means for actuating said feeding means to engage said smaller dimensioned portion in the hole in untooled work and to deliver said untooled work to said work support and to engage said larger dimensioned portion in tooled work on said support and remove said tooled work from said support, gaging means associated with said larger dimensioned portion for gaging the tooled work, and means responsive to said gaging means for controlling a relation between said work support and said tool.

28. In an internal grinding machine having a work support, a grinding wheel for operating in a hole in work carried by said support, means for feeding said wheel relative to the work a predetermined amount for each grinding cycle, means for effecting traverse between the wheel and work and to remove the wheel from the work at the end of a grinding operation, means for gaging the work while said wheel is removed from the work, and means responsive to said gaging means during a gaging operation to adjust the starting feed position of said wheel in advance of the next grinding operation.

MERTON H. ARMS.